United States Patent [19]

Andrei-Alexandru et al.

[11] Patent Number: 4,698,560

[45] Date of Patent: Oct. 6, 1987

[54] ADJUSTING DEVICE, ESPECIALLY FOR LOCKING AND UNLOCKING MOTOR VEHICLE DOORS

[75] Inventors: Marcel Andrei-Alexandru, Bietigheim-Bissingen; Wolfgang Kofink, Aichwald-Lobenrot; Eckhardt Schmid, Brackenheim; Volker Tietz, Heilbronn, all of Fed. Rep. of Germany

[73] Assignee: SWF Auto-Electric GmbH, Bietigheim-Bissingen, Fed. Rep. of Germany

[21] Appl. No.: 801,490

[22] Filed: Nov. 25, 1985

[30] Foreign Application Priority Data

Nov. 24, 1984 [DE] Fed. Rep. of Germany ....... 3442894

[51] Int. Cl.[4] .............................................. H02P 1/54

[52] U.S. Cl. ....................................... 318/54; 318/51; 318/57; 307/10 R; 70/277; 70/278

[58] Field of Search ....................... 318/34, 51, 53, 54, 318/57, 63, 65, 282, 283, 293; 70/237, 238, 239, 275, 276, 277, 278, 279, 280, 281, 282; 180/289; 307/10 R, 10 AT

[56] References Cited

U.S. PATENT DOCUMENTS

| | | | |
|---|---|---|---|
| 2,765,647 | 10/1956 | Carroll | 292/201 X |
| 3,544,804 | 12/1970 | Gaumer et al. | 70/278 X |
| 3,612,207 | 10/1971 | Cabanes | 180/289 X |
| 3,653,237 | 4/1972 | DuRocher | 70/264 |
| 3,747,379 | 7/1973 | Cabanes | 70/280 X |
| 4,203,039 | 5/1980 | Pritchard | 70/279 X |
| 4,358,718 | 11/1982 | Delomez | 318/54 |
| 4,427,929 | 1/1984 | Andrei-Alexandru et al. | 180/289 X |
| 4,450,390 | 5/1984 | Andrei-Alexandru et al. | 180/289 X |
| 4,537,049 | 8/1985 | Lupoli | 70/277 |
| 4,543,514 | 9/1985 | Fey | 180/289 X |
| 4,553,038 | 11/1985 | Fey | 307/10 AT |

FOREIGN PATENT DOCUMENTS

| | | | |
|---|---|---|---|
| 0167012 | 1/1986 | European Pat. Off. | 70/237 |
| 2626778 | 1/1977 | Fed. Rep. of Germany | 70/280 |
| 2498541 | 7/1982 | France | 70/237 |

*Primary Examiner*—William M. Shoop, Jr.
*Assistant Examiner*—Bentsu Ro
*Attorney, Agent, or Firm*—James B. Raden; Donald J. Lenkszus

[57] ABSTRACT

In vehicular electric door lock arrangement the running time of a first adjusting unit is longer than the worst possible running times of the other adjusting units. The first adjusting unit operates a switching unit via which the running time of the other adjusting units is preset. The separate timing element for the control of the various adjusting units used in prior systems can be omitted, because this timing function is provided by one of the adjusting units.

18 Claims, 5 Drawing Figures

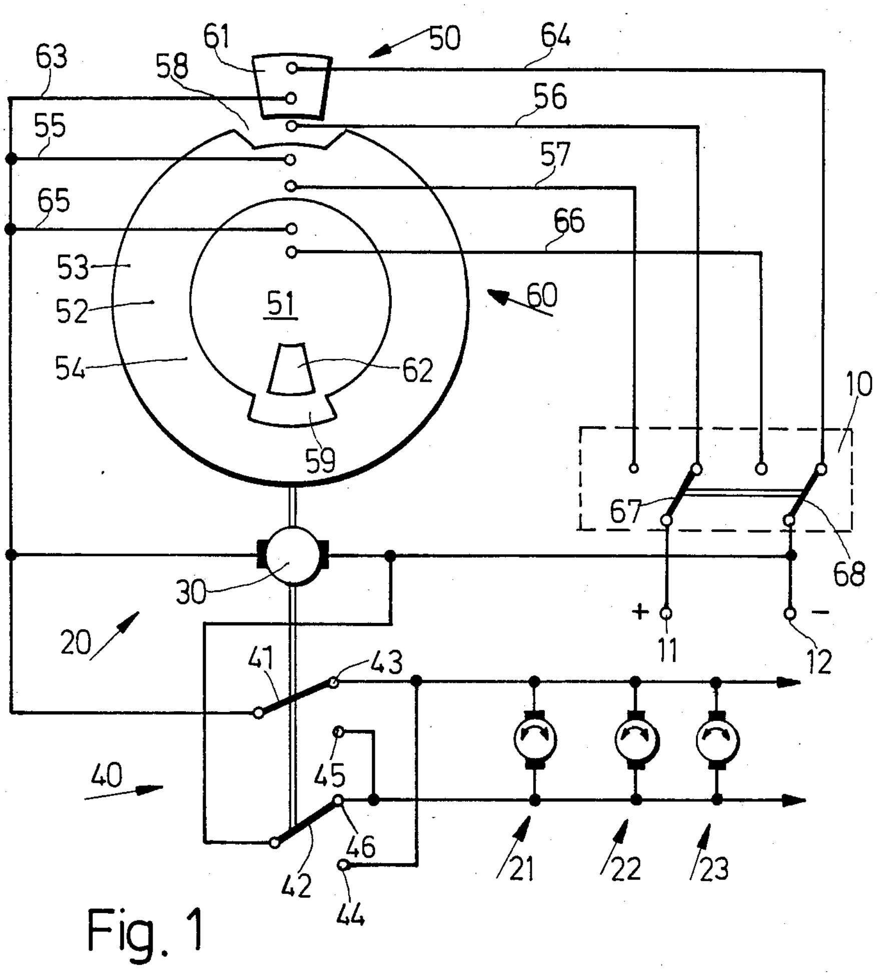
Fig. 1
Fig. 2
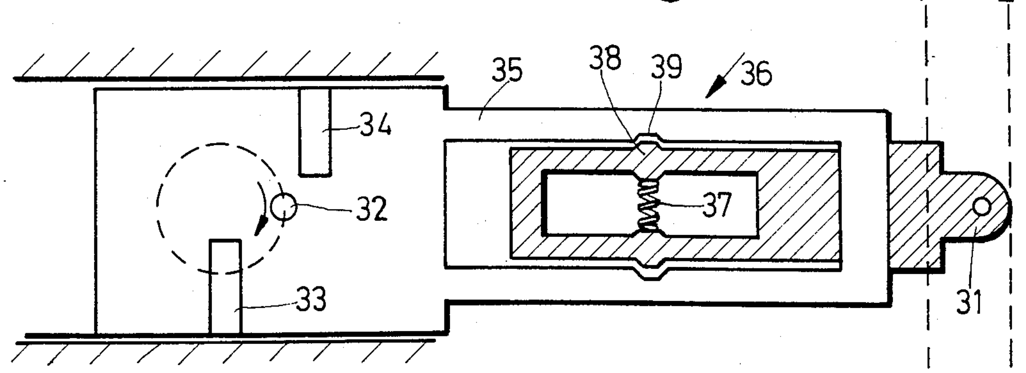

ADJUSTING DEVICE, ESPECIALLY FOR LOCKING AND UNLOCKING MOTOR VEHICLE DOORS

BACKGROUND OF THE INVENTION

The invention pertains to an adjusting device for locking and unlocking motor vehicle doors.

Electric motors are increasingly used as adjusting units for central door locking system on motor vehicles. There are systems in which the direction of rotation at the electric motor is not variable and the actuator is driven by the electric motor via a crank mechanism. In these systems a limit switch is associated with each adjusting unit to ensure that the actuator is always stopped in the end positions. Furthermore each adjusting unit includes a bilaterally effective coupling which provides for compensation between the required adjusting stroke of the actuator and the adjusting path permitted by the mounting conditions in a motor vehicle door. The system would not be operable, if this adjusting stroke predetermined by the crank mechanism were greater than the maximally adjusting path of the lock latch driven by the actuator.

Systems of this kind have been described in the German specifications OS Nos. 2 946 889 and 3 022 290 and in the U.S. Pat. No. 2,765,647. These systems have the advantage that the electric motors can be grounded and therefore the amount of circuitry is small. On the other hand an increased amount of circuitry is necessary because a limit switch and a coupling are assigned to each adjusting unit.

There are also central door locking systems for motor vehicles in which the direction of rotation of the electric motor is reversible. In these systems limit switches are not needed for each adjusting unit, because the end positions of the actuator can be preset by a mechanical stop and the actuator can be returned to its original position from any position by a change of the direction of rotation of the electric motor. The electric motors of systems of this kind are designed for short-time operation and therefore are automatically switched off after carrying out an adjustment. For this purpose a timing element is switched on via the operating switch which controls all electric motors in parallel. U.S. Pat. No. 3,653,237 describes a system of this kind including an electronic timing element. German specification OS No. 3 049 120 indicates that the operating switch itself can be formed as a mechanically operating pulse switch. Finally a system is described in German specification OS No. 3 248 194, in which a separate servo motor is used as a timing element to switch off the adjusting units connected in parallel after it has run through a given angle of rotation. All these embodiments require an additional element, namely a timing element, in addition to the adjusting unit thus increasing the production costs and the space requirement.

It should be noted that the structure of German specification OS No. 3 248 194, has the further disadvantage that the additional servo motor used as a timing element has a different switching characteristic from the electric motors of the adjusting units.

SUMMARY OF THE INVENTION

It is an object of the invention to reduce the production expense and the space requirement of systems of this kind without affecting the functional reliability thereby.

The invention is based on the idea that the additional timing element can be omitted, if the running time of a first adjusting unit is chosen to be longer than the maximal running time of the other adjusting units under unfavourable operating conditions. Then the said first adjusting unit can be used simultaneously as a timing element which presets the running time of the other adjusting units and switches them off after expiration of a given time. The system is thereby considerably simplified. Furthermore the functional reliability is considerably improved, because the running times of the adjusting units are coupled and therefore environmental influences, e.g. temperature changes, have the same effect on all adjusting units.

Because, in accordance with the invention, a first adjusting unit determines the running time, i.e. the switching-on period of the electric motors and of the other adjusting units and switches them off after the running time, care must be taken that the switch for switching on and off the other adjusting units actuated by the first adjusting unit is also actuated, if the adjusting member or the lock latch driven by this adjusting member were blocked. Thus in the system according to the invention, a bilaterally effective coupling or an overload protection element is assigned to the adjusting unit which determines the running time or switching-on period of the other adjusting units.

The basic idea of the invention can be realized in various ways. In a first example the first adjusting unit, i.e., the master motor, is exclusively controlled via the operating switch and the limit switch, while all other adjusting units are exclusively controllable through the switching unit actuated by the master motor. Thus in this embodiment, two completely independent circuits are available for the master motor and for the other adjusting units, so that the switching-on and switching-off times can also differ. This affects the maximum current when the system is switched on.

In another alternative the first adjusting unit is exclusively controlled via the operating switch and the limit switch, while all other adjusting units are controllable via the limit switch and the switching unit operable by the first adjusting unit. Thus switching-off of the other adjusting units is also ensured, if a defect in the switching unit operable by the master motor occurs, because the limit switch of the master motor switches off the other adjusting units.

A separate limit switch for the master motor is not necessary if, in accordance with the invention, all adjusting units are connected in parallel to each other, all adjusting units are controlled via the operating switch and the switching unit is operable by the first adjusting unit. The switching unit simultaneously takes over the function of the limit switch for the first adjusting unit.

BRIEF DESCRIPTION OF THE DRAWING

The invention will be better understood from a reading of the following detailed description in conjunction with the drawing in which:

FIG. 1 is a circuit diagram of a first embodiment in which the direction of rotation of the electric motor (master motor) of the first adjusting unit is not variable;

FIG. 2 is a diagrammatic view of a bilaterally coupling;

DETAILED DESCRIPTION

Figure 3:
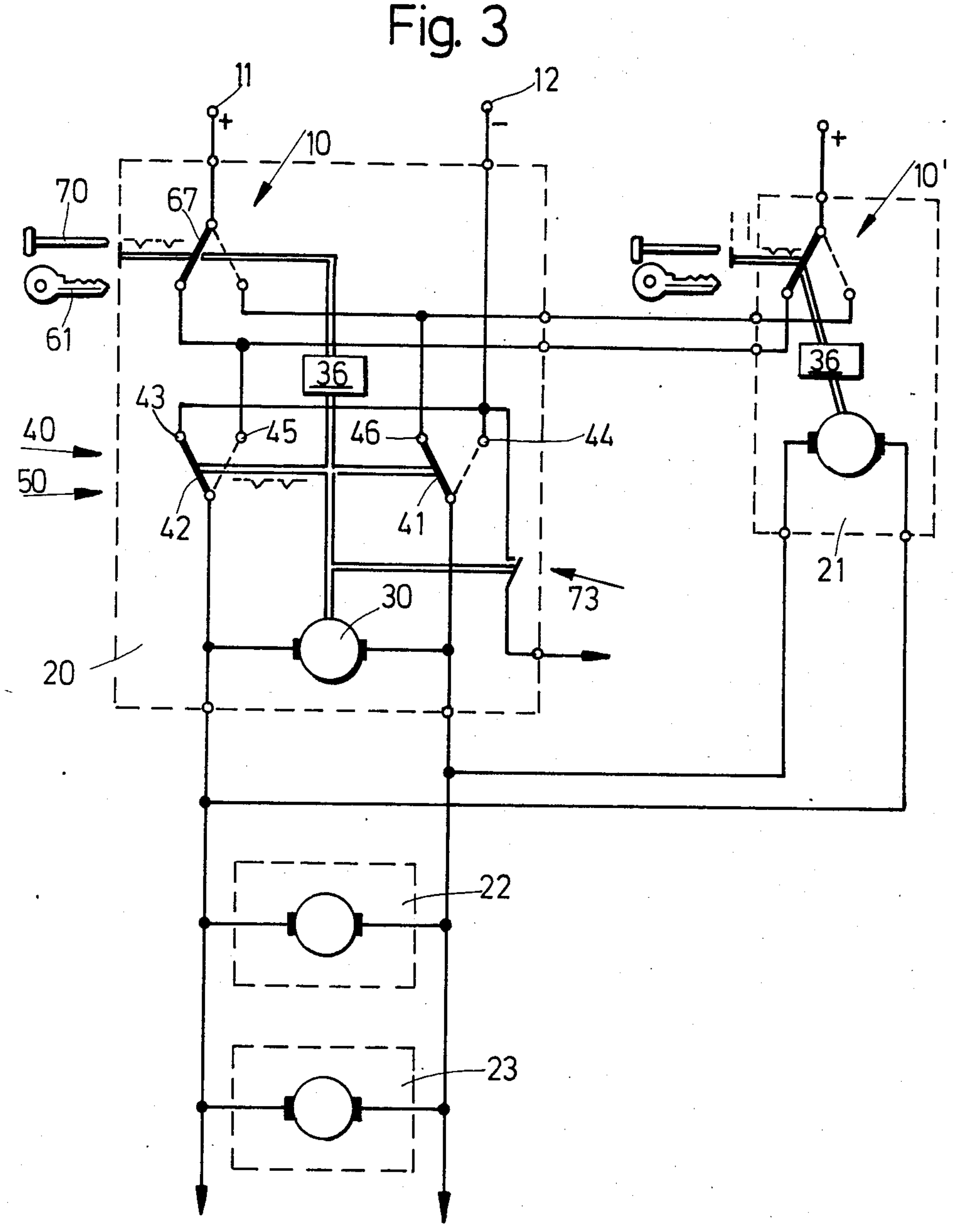
FIG. 3 is a first circuit diagram of an embodiment in which the direction of rotation of the electric motor (master motor) of the first adjusting unit is reversible.

FIG. 1 shows an embodiment of a door locking system in which a first adjusting unit 20 in the front passenger's door is controllable via an operating switch 10 in the driver's door, which first adjusting unit then controls other adjusting units 21, 22 and 23 in the front doors and the trunk cover. No adjusting unit is provided in the driver's door itself, therefore the lock is exclusively mechanically operated. All adjusting units are supplied from a voltage source having positive terminal 11 and negative terminal 12.

The first adjusting unit includes an electric motor 30, having a fixed direction of rotation. This non-reversible electric motor 30 operates an actuator 31 via a crank mechanism. Actuator 31 is coupled with the lock and, if required, with an inside lock knob in a driver's door. See FIG. 2.

In FIG. 2 the drive mechanism is shown schematically. A crank pin 32 alternately co-operates with one of two stops 33 and 34, which are arranged with a spacing from each other on a slide 35 and project into the path of motion of the crank pin 32. Slide 35 is connected with the actuator 31 via a bilaterally effective lockable coupling 36. Normally the locking cams 38 supported on a spring 37 engage in corresponding recesses 39 on the slide, so that the actuator 31 is coupled with the slide 35. If, however, the actuator 31 is blocked during an adjusting action, the slide 35 can nevertheless reach its end position, because then this lockable coupling 36 is disconnected. It is thereby ensured that, independently of the movability of the actuator 31, the crank pin 32 driven by the electric motor 30 can always be changed over into one of its end positions which differ by 180 degrees. This ensures that in case of a defect in the mechanical part of the door locking system the switching unit 40 actuated by the electric motor 30 and the limit switch 50 also actuated by this electric motor 30 are operated and thus the adjusting units 20, 21, 22 and 23 are disconnected from the voltage source in blocked condition.

In the embodiment according to FIG. 1 the limit switch 50 includes a switch wafer 51 with three contact paths 52, 53 and 54. These contact paths co-operate with three contact springs 55, 56 and 57. The contact spring 55 always effects an electrically conductive connection between the electric motor 30 and the inner contact path 52. The two other contact springs 56 and 57 slide on the outer contact path 53 and on the inner contact path 54 of which each has a short opening 58 or 59 which openings are diametrically opposite each other. A two-way switch 60 is thereby created, because the contact spring 55 is either connected in an electrically conductive manner with the contact spring 56 or with the contact spring 57 or with both contact springs 56 and 57. Switch wafer 51 also includes two diametrically opposite contact segments 61 and 62 which can produce electrically conductive connections between the contact springs 63 and 64 and 65 and 66 respectively.

The two contact springs 56 and 57 are connected to two outputs of the operating switch 10, to which positive potential is connectable via a movable bridging contact 67. The contact springs 64 and 66 are connected to two further outputs of the operating switch 10, to which negative potential is alternately connectable via the bridging contact 68. Thus operating switch 10 is formed as a bipolar two-way switch.

In the embodiment according to FIG. 1 the switching unit 40 includes two movable changeover contacts 41 and 42 coupled with each other and directly connected in parallel with the electric motor 30. Changeover contacts 41 and 42 co-operate with stationary contacts 43, 45 and 44, 46 to which the electric motors of the other adjusting units are connected in parallel to each other. Thus the switching unit 40 is formed as a reversing switch, which in the end position is mechanically changed over by the electric motor 30 from one switching position into the other. However during the adjusting action the reversing switch remains in the original switching position. The mode of operation of the embodiment according to FIGS. 1 and 2 is described below, wherein it is assumed that the actuator 31 is initially in the unlocked position E. The electric motor 30 of the first adjusting unit 20 is short-circuited, because negative potential is conducted to the controllable motor terminal via the contact segment 61 and the bridging contact 68 of the operating switch. Thus the electric motors of the other adjusting unit 21, 22 and 23 are also short-circuited via the switching unit 40.

If the operating switch 10 is now changed over into its other switching position the short-circuit is opened via the bridging contact 68. At the same time positive potential is connected to the contact spring 57 and thus to the inner contact path 52 and the contact spring 55 to the electric motor 30. The electric motor 30 drives the crank pin 32 in clockwise direction. At the same time the electric motors of the other adjusting units 21, 22 and 23 are also connected in parallel to the electric motor 30 via switching unit 40, so that these motors also start in predetermined directions of rotation. After a given angle of rotation the crank pin 32 reaches the stop 33 and on the remainder of its adjusting path thereby adjusts the slide 35 and normally also the actuator 31. After an angle of rotation of 180 degrees of the switch wafer 51 the contact spring 57 lies in the opening 59, so that the voltage connection to electric motor 30 is interrupted. At the same time a short circuit for the electric motor 30 is effected via the contact springs 65 and 66 which then rest upon the contact segment 62. Thereby the electric motor 30 is abruptly braked in its other end position in which the actuator 31 is in the locked position V. Moreover the switching unit 40 is changed over after an angle of rotation of 180 degrees has been run through, so that the changeover contacts 41 and 42 now rest upon the stationary contacts 45 and 44. Thus a reversal of the direction of rotation of the electric motors of the other adjusting units 21, 22 and 23 is prepared. However these motors cannot continue to run, because they are connected in parallel with electric motor 30 which at this time is short-circuited.

If at a later time the operating switch 10 is again changed over into the switching position shown, the short circuit is opened via the contact segment 62 and at the same time an operating circuit is connected via the contact springs 55 and 56. The electric motor again starts in clockwise direction and adjusts the switch wafer 51, until after an angle of rotation of 180 degrees the original position is reached. During this adjustment from the locked position V into the unlocked position E the electric motors of the other adjusting units 21, 22 and 23 run in the opposite direction of rotation.

Thus motor 30 of the adjusting unit 20 is assigned a limit switch 50 which switches off adjusting unit 20 in the desired end position. Furthermore, motor 30 operates a switching unit 40 via which the other adjusting units 21, 22 and 23 are controlled. The running time of adjusting unit 20 is selected such that it is reliably longer than the maximal running time of the other adjusting units under unfavourable operating conditions. In practice the actuator 31 may not yet have reached its end position, when the actuators operated by the other adjusting units 21, 22 and 23 have already occupied their end position in which they run against a stop.

For example the reduction gearing of adjusting unit 20 will be laid out such that electric motor 30 changes over the associated actuator from one end position into the other only after a running time of 3 ms. In contrast thereto the reduction gearings of the other adjusting units are to be laid out in such a way that their actuators reach the other end position after a running time of 1 ms. The electric motors of these other actuators 21, 22 and 23 are then blocked for 2 ms until they are switched off via the limit switch 50 assigned to the first adjusting unit 20.

In the embodiment according to FIG. 1 adjusting unit 20 is exclusively controlled via the operating switch 10 and limit switch 50, while all other adjusting units are controlled via the limit switch 50 and the switching unit 40. Thus the electric motors of the other adjusting units 21, 22 and 23 are switched off via the limit switch 50, while the switching unit 40 is only utilized for reversing polarity or direction of rotation. In the embodiment of FIG. 1 a motor rotating in only one direction of rotation is used for driving a first actuator, while all other adjusting units are driven by a reversible electric motor. An embodiment of this kind has the advantage that a conventional adjusting unit with a coupling can be used as a timer for the other series-produced adjusting units having reversible electric motors.

The limit switch is formed as a two position switch with overlapped switching and is connected in series with a two position operating switch. The overlapped switching has the advantage that the electric motor 30 carries out its adjusting action completely even if the switching position of the operating switch is changed a short time after it is switched on.

It is furthermore important that a short circuit for the electric motor 30 is created via the contact segments 61 and 62 and the other bridging contact 68 of the operating switch 10. By providing this short circuit the electric motor 30 is braked very rapidly, so that the interruptions 58 and 59 on the contact paths 53 and 54 may only be of small angular range without entailing the risk that the electric motor 30 continues to run. Special significance is attached to the above described features, because they can also advantageously be used in prior systems having electric motors rotating in one direction.

FIG. 3 shows an embodiment, in which the first adjusting unit 20 is arranged in the driver's door. The running time of the other adjusting units 21 in the front passenger's door and adjusting units 22 and 23 is preset via the first adjusting unit 20. Furthermore in the embodiment according to FIG. 3 all adjusting locks include a reversible electric motor. The electric motors of all adjusting units 20, 21, 22 and 23 are connected in parallel to each other and to switching unit 40 formed as a polarity reversing switch. Switching unit 40 is actuated by the electric motor 30. Thereby switching unit 40 simultaneously serves as a limit switch 50 for electric motor 30. Electric motor 30 directly actuates the switching unit 40. Coupling 36 is provided between the electric motor and inside lock knob 70 and lock operatable by a key 61. Coupling 36 has approximately the shape of that one indicated in FIG. 2. The central door locking system also can be controlled via an operating switch 10' in the front passenger's door. In this embodiment a short-circuit brake for the various servo motors is not necessary, because the motor actuators run against a stop and their end position is defined by the stop alone. Therefore in this embodiment two stationary contacts 43, 44 of the switching unit 40 formed as a reversing switch can directly be connected with the negative pole 12 of the voltage source, whereas positive potential 11 can be alternately connected to the other stationary contacts 45, 46 via the operating switch 10.

When the switches of FIG. 3 occupy the switching positions shown, the motors of all adjusting units are idle. If the operating switch 10 or the operating switch 10' is changed over into the other switching position via the key 61 or the inside lock knob 70, the motors of all adjusting units are simultaneously applied with voltage. Positive potential is connected to the changeover contact 41 via the bridging contact 67 of the operating switch 10, while the other changeover contact 42 of the switching unit 40 carries negative potential. All motors start in the same direction of rotation and adjust the associated actuators. After a short time the actuators of the other adjusting units 21, 22 and 23 run against a stop and the associated electric motor is blocked. The electric motor 30 of the first adjusting unit 20 has a longer running time and continues to run. Thus the actuator of this adjusting unit reaches its end position at a later time. At this time switching unit 40 is changed over from the switching position shown into the switching position shown in broken lines, so that the circuit carrying positive potential is interrupted via the changeover contact 41 of the switching unit 40. Thus switching unit 40 acts both as a limit switch for the first adjusting unit 20 and as a control switch for the other adjusting units. If at a later time the operating switch 10 is again changed over into the position shown in unbroken lines all electric motors are supplied with positive potential via the stationary contact 45 and the changeover contact 42 and start in the opposite direction of rotation. Again the actuators of the other adjusting units 21, 22 and 23 reach their end position earlier than the actuator driven by the electric motor 30. Thus the electric motors of the adjusting units 21, 22 and 23 are connected to operating voltage while they are in a blocked condition for a period of time until they are switched off via the switching unit 40 actuated via the first electric motor 30.

FIG. 3 shows that when in the end position, one or the other terminal of all reversible electric motors is connected with the negative pole of the voltage source.

If it is desired to disconnect the electric motors completely from the voltage source in the end positions, the operating switches 10 could be formed as bipolar two-way switches in the embodiment according to FIG. 3. However this means using bigger and more expensive switches and an increased amount of circuitry especially if control via two operating switches is provided.

The first adjusting unit 20 could actuate further switches 73 and thus could be used as a timing element for further adjusting devices. For example switch 73 could provide a short-duration switching pulse for exciting a magnet, via which magnet the tank cap is to be locked. An antenna motor, a sunroof adjusting motor or a window lifter system could also be controlled via switch 73.

In the embodiment according to FIGS. 1 and 3 a mechanically operating polarity reversing switch is employed as switching unit 40 for the control of the other adjusting units 21, 22, 23. Because this switching unit 40 must carry the operating current for the electric motors of the other adjusting units, it must be designed for the appropriate amperage and thus increased costs could be a consequence.

Figure 4:
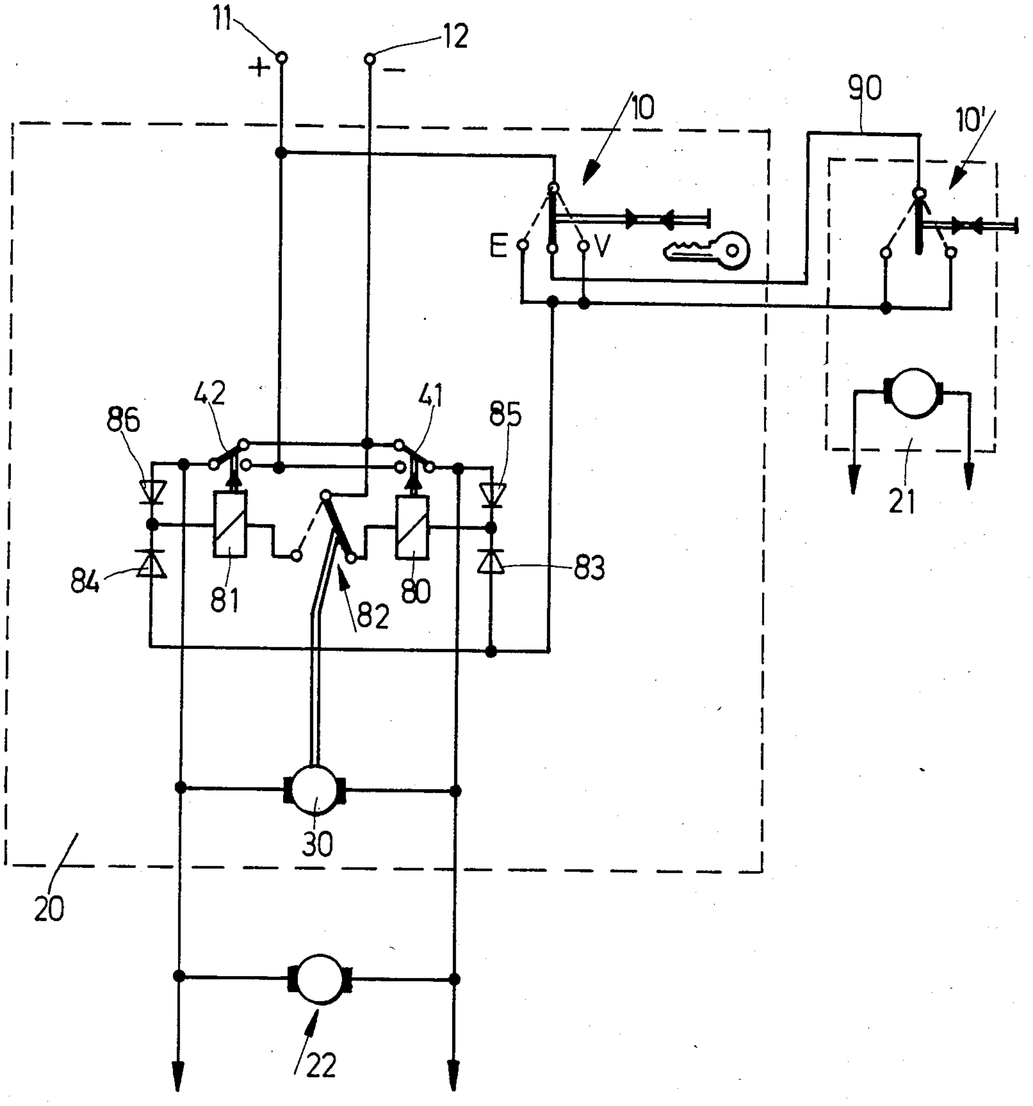
FIG. 4 is a circuit diagram similar to FIG. 3, however with relay control.

In the embodiment of FIG. 4 the polarity reversing switch is operated via relays 80 and 81. Relays 80 and 81 are controlled by a two-way switch 82 mechanically operated by electric motor 30 of the first adjusting unit 20 and operate the changeover contacts 41 and 42. Furthermore relays 80 and 81 are controlled by operating switch 10 via decoupling diodes 83, 84. Operating switch 10 thus must only switch small operating currents. Thus in the embodiment according to FIG. 4, the limit switches, switching unit for control of other adjusting units, and elements of the operating switch are combined as a structural unit. Because the operating switch 10, in contrast to the embodiments hitherto described, automatically springs back to the zero position shown in the drawing when the operating handle is released, the switching-on signal has to be latched. This is effected via a latching circuit between the changeover contacts 41, 42 and the corresponding relays 80, 81, formed by diodes 85, 86.

FIG. 4 shows that in the rest position the motors of all adjusting units are short-circuited. Two-way switch 82 is inserted in the energization circuit of a relay 80, so that, when the operating switch 10 is moved into the unlocking position E, relay 80 is energized and thus voltage is applied to all motors via the changeover contact 41. At the same time the latching circuit for relay 80 is connected via diode 85, so that the operating switch 10 can again be returned into its zero position. Relay 80 remains energized until two-way switch 82 springs into the other switching position shown in broken lines after carrying out of the adjusting action and thus interrupts the energization circuit for relay 80.

Then all motors are again short-circuited. If the operating switch is brought into the locking position V, relay 81 is energized and diode 86 is held in energized condition via the latching circuit until the two-way switch again occupies the position shown. In this embodiment operating switch 10 and limit switch or two-way switch 82 only switch control currents, the operating currents are switched via relay contacts capable of carrying high current loads.

Figure 5:
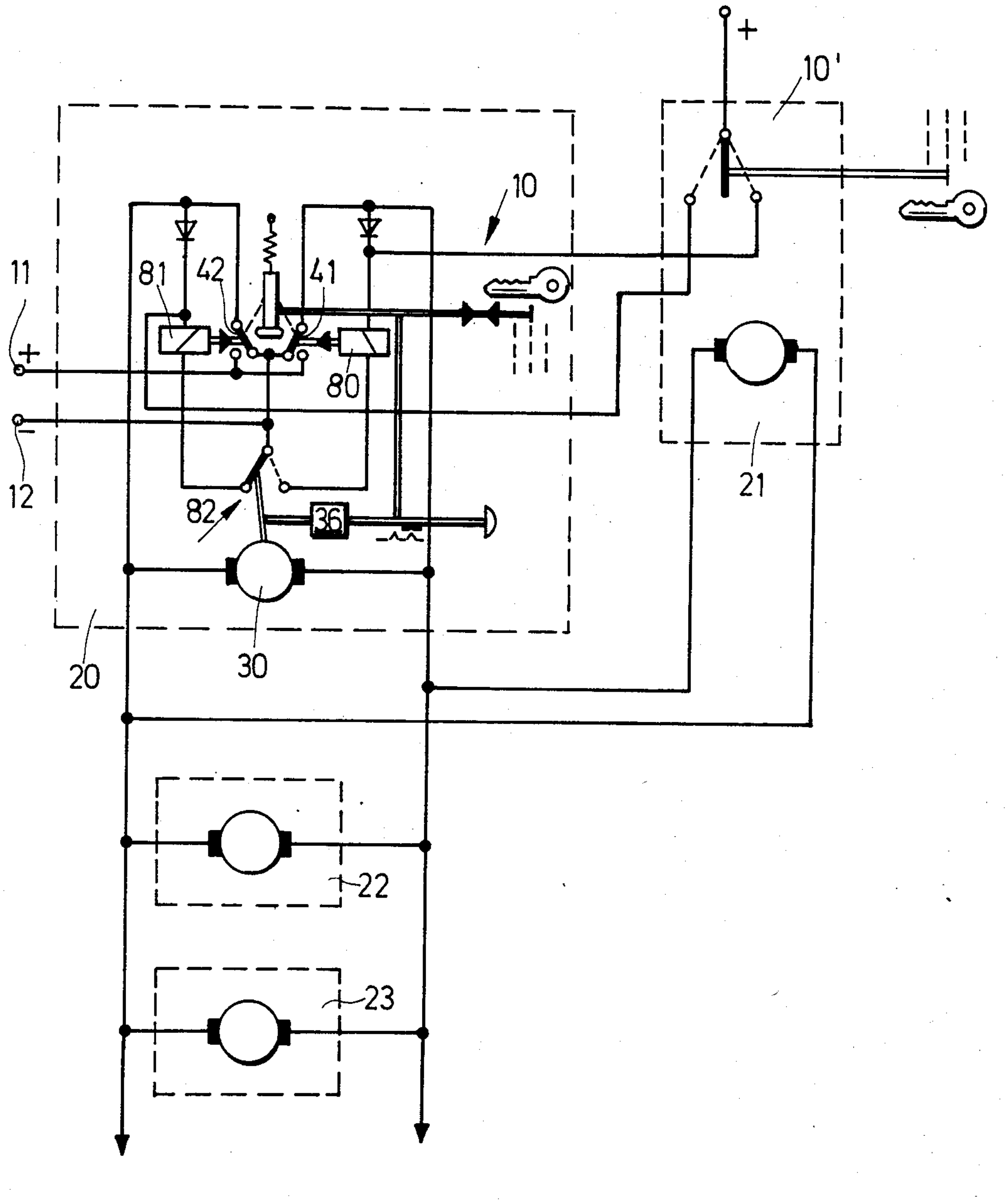
FIG. 5 is a third circuit diagram similar to FIG. 4.

The embodiment of FIG. 5 differs from the embodiment according to FIG. 4. Operating switch 10 directly acts upon the changeover contacts 41 and 42 of the relays 80, 81. Thus changeover bridging contacts 41, 42 are mechanically adjusted and the relays are directly energized via the latching circuit, when the operating switch 10 is actuated. Switch 10 is again formed as a non-locking switch.

A further difference between the embodiments according to FIGS. 4 and 5 is that, in the embodiment according to FIG. 5, the two operating switches 10 and 10' are equally effective. In the embodiment according to FIG. 4 the system can only be controlled via the operating switch 10' when the operating switch 10, in the driver's door, occupies the zero position as shown because a control potential is carried to the operating switch 10' only in the zero position of the operating switch 10 via the lead 90.

What is claimed is:

1. An adjusting device for locking and unlocking motor vehicle doors, comprising:

a first electromechanical adjusting unit for driving an associated actuator between two end positions in a first time period;

a plurality of other electromechanical adjusting units for driving respective other associated actuators between two end positions in a second period of time;

at least one operating switch for controlling said first and said plurality of other adjusting units;

limit switch means for switching off said first adjusting unit at a predetermined one of said end positions;

said first time period between said first and second end positions of said first adjusting unit being longer than said second time period of the other adjusting units of said plurality of adjusting units; and a switching unit operated by said first adjusting unit via which said second time period of the other adjusting units is preset.

2. An adjusting device in accordance with claim 1, wherein:

said switching unit is directly actuated from the first adjusting unit by a bilaterally effective coupling between said first adjusting unit and its associated actuator.

3. An adjusting device in accordance with claim 1, wherein:

said first adjusting unit is exclusively controllable via said operating switch and said limit switch means; and all said other adjusting units are exclusively controllable via said switching unit operable via said first adjusting unit.

4. An adjusting device in accordance with claim 2, wherein:

said first adjusting unit is exclusively controllable by said operating switch and said limit switch means; and all said other adjusting units are exclusively controllable by said switching unit which is operable by said first adjusting unit.

5. An adjusting device in accordance with claim 1, wherein:

said first adjusting unit is exclusively controllable by said operating switch and said limit switch means; and all said other adjusting units are controllable by said limit switch means and said switching unit.

6. An adjusting device in accordance with claim 2, wherein:

said first adjusting unit is exclusively controllable by said operating switch and said limit switch means; and all said other adjusting units are controllable by said limit switch means and said switching unit.

7. An adjusting device in accordance with claim 1, wherein:

all of said plurality of adjusting other units are connected in parallel to one another and are controllable by said operating switch and said switching unit; and said switching unit thereby simultaneously fulfills the function of said limit switch means.

8. An adjusting device in accordance with claim 2, wherein:

all of said plurality of adjusting other units are connected in parallel to one another and are controllable by said operating switch and said switching unit; and said switching unit thereby simultaneously fulfills the function of said limit switch means.

9. An adjusting device in accordance with claim 1, wherein:

said first adjusting unit includes an electric motor rotatable in only one direction of rotation;

said motor shifts its associated actuator from said first end position into said second end position during an angle of rotation of 180 degrees; and all said other adjusting units include reversible electric motors, said switching unit includes a polarity reversing switch which is changed over by said first adjusting unit at the end of an angle of rotation of 180 degrees to control said reversible electric motors.

10. An adjusting device in accordance with claim 9, wherein:

said operating switch is inserted in a motor circuit of said first adjusting unit electric motor which also includes at least two terminals in series with said limit switch means, said limit switch means being formed as a two-position switch;

said polarity reversing switch has two movable changeover contaccts which co-operate with stationary contacts interconnected in pairs, to which the electric motors of said other adjusting units are connected in parallel to one another; and said movable changeover contacts are connected with the terminals of the electric motor of said first adjusting unit.

11. An adjusting device in accordance with claim 10, wherein:

said limit switch means includes a switch wafer with three contact paths of which one is permanently connected with a contact spring connected with said electric motor, the other two of said contact paths each have a short opening diametrically opposite to each other and co-operate with contact springs connected to two outputs of said operating switch.

12. An adjusting device in accordance with claim 11, wherein:

said switch wafer has two additional contact segments diametrically opposite to each other, and said operating switch has two further outputs to the additional contact segments short-circuiting said motor, a potential is conducted to said electric motor in its end positions via one of said two additional contact segments.

13. An adjusting device in accordance with claim 7, wherein:

each of said plurality of other adjusting units includes a reversible electric motor, said electric motors of all other adjusting units are connected in parallel to each other with a polarity reversing switch of said switching unit, said polarity reversing switch is controlled by the electric motor of said first adjusting unit and that said reversing switch simultaneously serves as a limit switch for the electric motor of said first adjusting unit.

14. An adjusting device in accordance with claim 13, wherein:

said polarity reversing switch has two movable changeover contacts coupled with each other, and which are mechanically operable by said first adjusting unit.

15. An adjusting device in accordance with claim 13, wherein:

said polarity reversing switch has two change-over contacts operatable by two relays and said relays are controllable via a two-way switch mechanically operable by said first adjusting unit.

16. An adjusting device in accordance with claim 15, wherein:

between the change-over contact of each said relay and its coil there is connected a latching circuit and each said relay is controllable by said operating switch formed as a nonlocking switch and remains energized until said two-way switch and said limit switch means are operated by said first adjusting unit.

17. An adjusting device in accordance with claim 16, wherein:

said operating switch directly acts upon the change-over contacts of said relays and the respective relay is energized by closing said latching circuit.

18. An adjusting device in accordance with claim 17, further comprising a second operating switch only operable in the rest position of said operating switch.

* * * * *